US008756578B2

(12) United States Patent
Bates (10) Patent No.: US 8,756,578 B2
(45) Date of Patent: *Jun. 17, 2014

(54) IMPACT INDICATION OF THREAD-SPECIFIC EVENTS IN A NON-STOP DEBUGGING ENVIRONMENT (71) Applicant: International Business Machines Corporation, Armonk, NY (US)

(72) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,235

(22) Filed: Dec. 4, 2012

(65) Prior Publication Data

US 2013/0097590 A1  Apr. 18, 2013

Related U.S. Application Data (63) Continuation of application No. 13/086,073, filed on Apr. 13, 2011.

(51) Int. Cl.
G06F 9/44  (2006.01)
(52) U.S. Cl.
USPC ............................ 717/125; 717/128; 717/129
(58) Field of Classification Search
None
See application file for complete search history.

(56) References Cited

U.S. PATENT DOCUMENTS

| 5,506,967 | A | | 4/1996 | Barajas et al. |
| 5,632,032 | A | * | 5/1997 | Ault et al. ..................... 718/100 |
| 5,787,245 | A | * | 7/1998 | You et al. ................... 714/38.13 |
| 5,815,653 | A | | 9/1998 | You et al. |
| 6,026,362 | A | * | 2/2000 | Kim et al. ..................... 705/317 |
| 6,113,645 | A | | 9/2000 | Benitz et al. |
| 6,158,045 | A | * | 12/2000 | You ................................. 717/124 |
| 6,295,613 | B1 | | 9/2001 | Bates et al. |
| 6,378,124 | B1 | | 4/2002 | Bates et al. |
| 6,378,125 | B1 | * | 4/2002 | Bates et al. ................... 717/129 |
| 6,480,818 | B1 | | 11/2002 | Alverson et al. |
| 6,587,967 | B1 | | 7/2003 | Bates et al. |
| 6,625,635 | B1 | | 9/2003 | Elnozahy |
| 6,681,384 | B1 | * | 1/2004 | Bates et al. ................... 717/129 |
| 6,854,073 | B2 | | 2/2005 | Bates et al. |
| 6,915,513 | B2 | | 7/2005 | Duesterwald et al. |
| 6,981,248 | B2 | | 12/2005 | Bates et al. |
| 7,020,871 | B2 | | 3/2006 | Bernstein et al. |
| 7,178,145 | B2 | | 2/2007 | Bono |
| 7,203,927 | B2 | | 4/2007 | Al-Azzawe et al. |

(Continued)

OTHER PUBLICATIONS

Prus et al. "Non-Stop Multi-Threaded Debugging in GDB", pp. 1-13, 2008.*

(Continued)

Primary Examiner — Isaac Tecklu
(74) Attorney, Agent, or Firm — Biggers Kennedy Lenart Spraggins LLP (57) ABSTRACT A non-stop debugging environment includes a debugger configured to debug a multi-threaded debuggee, where encountering an event by one of the threads stops execution of only the one thread without concurrently stopping execution of other threads. In such a non-stop debug environment, impact indication of thread-specific events includes tracking, by the debugger, activity associated with a thread-specific event and displaying, by the debugger in a graphical user interface ('GUI'), an indication of thread-specific event impact in dependence upon the tracked activity.

6 Claims, 8 Drawing Sheets

(56) References Cited

U.S. PATENT DOCUMENTS

| | | |
|---|---|---|
| 7,228,543 B2 | 6/2007 | Baylis |
| 7,574,697 B2 | 8/2009 | Biberstein et al. |
| 7,684,970 B2 | 3/2010 | Hooper et al. |
| 7,770,155 B2 | 8/2010 | Bates et al. |
| 7,774,787 B2 | 8/2010 | Leino et al. |
| 7,779,390 B1 | 8/2010 | Allavarpu et al. |
| 7,844,952 B2 | 11/2010 | Barsness et al. |
| 7,865,883 B1 | 1/2011 | Sistare et al. |
| 7,890,935 B2 | 2/2011 | Bates |
| 7,941,788 B2 | 5/2011 | Browning et al. |
| 7,992,133 B1 | 8/2011 | Theroux et al. |
| 8,136,097 B2 | 3/2012 | Konishi et al. |
| 8,141,046 B2 | 3/2012 | Bates et al. |
| 8,196,109 B2 | 6/2012 | Fung et al. |
| 8,201,152 B2 | 6/2012 | Li et al. |
| 8,327,336 B2 | 12/2012 | Bates et al. |
| 8,380,966 B2 | 2/2013 | Codrescu et al. |
| 2002/0073401 A1 | 6/2002 | Sangavarapu et al. |
| 2002/0124042 A1 | 9/2002 | Melamed et al. |
| 2003/0009745 A1 | 1/2003 | Bates et al. |
| 2003/0028862 A1 | 2/2003 | Bates et al. |
| 2003/0131284 A1 | 7/2003 | Flanagan et al. |
| 2003/0208746 A1* | 11/2003 | Bates et al. .................. 717/129 |
| 2004/0054944 A1 | 3/2004 | Bates et al. |
| 2004/0210876 A1 | 10/2004 | Stall et al. |
| 2005/0010678 A1 | 1/2005 | Pugh et al. |
| 2005/0235264 A1 | 10/2005 | Hines |
| 2005/0246691 A1 | 11/2005 | Hsieh et al. |
| 2005/0288917 A1 | 12/2005 | Hooper et al. |
| 2005/0289396 A1 | 12/2005 | Hooper et al. |
| 2005/0289514 A1 | 12/2005 | Hooper et al. |
| 2006/0143531 A1 | 6/2006 | Kilian et al. |
| 2007/0168968 A1 | 7/2007 | Bates et al. |
| 2007/0226740 A1 | 9/2007 | Li et al. |
| 2007/0234294 A1 | 10/2007 | Gooding |
| 2007/0260929 A1 | 11/2007 | Liu et al. |
| 2007/0283330 A1 | 12/2007 | Bates |
| 2007/0288907 A1 | 12/2007 | Olivier et al. |
| 2007/0288939 A1 | 12/2007 | Stall |
| 2008/0133977 A1 | 6/2008 | Chun et al. |
| 2008/0134149 A1 | 6/2008 | Bates et al. |
| 2008/0263522 A1* | 10/2008 | Fung et al. .................. 717/125 |
| 2009/0164976 A1 | 6/2009 | Gritter et al. |
| 2009/0320001 A1 | 12/2009 | Bates et al. |
| 2009/0327429 A1 | 12/2009 | Hughes et al. |
| 2010/0049955 A1 | 2/2010 | Moyer et al. |
| 2010/0064283 A1 | 3/2010 | Pett |
| 2010/0205377 A1 | 8/2010 | Moyer |
| 2010/0242026 A1 | 9/2010 | Bates et al. |
| 2011/0072309 A1 | 3/2011 | Sakai et al. |
| 2011/0179399 A1 | 7/2011 | Bekiroglu et al. |
| 2012/0102463 A1 | 4/2012 | Bates |
| 2012/0159261 A1 | 6/2012 | Maybee et al. |
| 2012/0159451 A1 | 6/2012 | Bates |
| 2012/0159487 A1 | 6/2012 | Bates |
| 2012/0198002 A1 | 8/2012 | Goulart et al. |
| 2012/0210305 A1 | 8/2012 | Bates |
| 2012/0222008 A1 | 8/2012 | Bates |
| 2012/0266134 A1 | 10/2012 | Bates |
| 2012/0266138 A1 | 10/2012 | Bates |
| 2012/0266139 A1 | 10/2012 | Bates |
| 2012/0266140 A1 | 10/2012 | Bates |
| 2013/0067438 A1 | 3/2013 | Bates |
| 2013/0074041 A1 | 3/2013 | Bates |
| 2013/0074044 A1 | 3/2013 | Bates |
| 2013/0097589 A1 | 4/2013 | Bates |
| 2013/0097591 A1 | 4/2013 | Bates |

OTHER PUBLICATIONS

Sidwell, et al., "Non-Stop Multi-Threaded Debugging in GDB", Proceedings of the GCC Developers' Summit, Jun. 17-19, 2008, pp. 1-14, CodeSourcery Inc, Ottawa, Ontario, Canada.
Office Action, U.S. Appl. No. 13/086,073, Apr. 23, 2013, pp. 1-18.
Mark, D., et al., "Debugging" Chapter From, More iPhone 3 Development, Tackling iPhone SDK 3, 2009, pp. 495-526, Apress. Online ISBN: 978-1-4302-2506-5.
Harrow, Jr., J., "Runtime Checking of Multithreaded Applications with Visual Threads," K. Havelund, J. Penix, and W. Visser (Eds.): SPIN 2000, LNCS 1885, 2000, pp. 331-342, Springer-Verlag Berlin Heidelberg. URL: ftp://159.226.92.10/pub/netlib/spin/ws00/18850335.pdf.
Office Action, U.S. Appl. No. 13/028,269, Apr. 3, 2013, pp. 1-36.
Office Action, U.S. Appl. No. 13/674,165, Apr. 2, 2013, pp. 1-29.
Office Action, U.S. Appl. No. 13/033,925, Apr. 1, 2013, pp. 1-20.
Office Action, U.S. Appl. No. 13/674,235, Mar. 28, 2013, pp. 1-13.
Office Action, U.S. Appl. No. 13/085,725, Mar. 28, 2013, pp. 1-53.
Office Action, U.S. Appl. No. 13/674,397, Apr. 1, 2013, pp. 1-42.
Office Action, U.S. Appl. No. 13/085,628, Jun. 12, 2013.
Office Action, U.S. Appl. No. 13/692,065, Jun. 14, 2013.
Office Action, U.S. Appl. No. 13/693,802, Jun. 7, 2013.
Final Office Action, U.S. Appl. No. 13/085,725, Oct. 2, 2013.
Final Office Action, U.S. Appl. No. 13/028,269, Oct. 7, 2013.
Final Office Action, U.S. Appl. No. 13/033,925, Oct. 4, 2013.
Final Office Action, U.S. Appl. No. 13/674,165, Oct. 7, 2013.
Final Office Action, U.S. Appl. No. 13/674,235, Oct. 3, 2013.
Final Office Action, U.S. Appl. No. 13/674,397, Oct. 3, 2013.
Final Office Action, U.S. Appl. No. 13/085,467, Oct. 10, 2013.
Final Office Action, U.S. Appl. No. 13/085,628, Oct. 10, 2013.
Notice of Allowance, U.S. Appl. No. 13/086,073, Oct. 10, 2013.
Final Office Action, U.S. Appl. No. 13/692,065, Oct. 10, 2013.
Final Office Action, U.S. Appl. No. 13/693,802, Oct. 11, 2013.
Roberts, P., "Implementation and Evaluation of Data Breakpoint Schemes in an Interactive Debugger", Master's Thesis, Jun./Dec. 1996, pp. 1-96, The University of Utah, Department of Computer Science, Salt Lake City, UT.
Office Action, U.S. Appl. No. 13/674,235, Bates, Mar. 28, 2013, pp. 1-13.

* cited by examiner

IMPACT INDICATION OF THREAD-SPECIFIC EVENTS IN A NON-STOP DEBUGGING ENVIRONMENT

CROSS-REFERENCE TO RELATED APPLICATION

This application is a continuation application of and claims priority from U.S. patent application Ser. No. 13/086,073, filed on Apr. 13, 2011.

BACKGROUND OF THE INVENTION

1. Field of the Invention

The field of the invention is data processing, or, more specifically, methods, apparatus, and products for impact indication of thread-specific events in a non-stop debugging environment.

2. Description of Related Art

Software source code is increasingly complex and execution of such software may be multi-threaded. Software development is evolving to provide enhanced methods of debugging multi-threaded software applications. In traditional debugging, an event encountered by any one thread stops execution of all threads of the multi-threaded solution. This form of debugging may be referred to as 'all-stop' debugging. in contrast to all-stop debugging, the enhanced multi-threaded debugging enables an event encountered by one thread to stop only that one thread's execution while all other threads remain executing. This form of debugging is referred to as non-stop debugging. Non-stop debugging is a bit of a misnomer, however, in that some threads actually do stop execution. The primary difference between non-stop and all stop debugging, is that in non-stop debugging execution of all threads of a multi-threaded program need not be stopped upon a single thread encountering an event, while in all-stop debugging execution of all threads is stopped upon a single thread of the multi-threaded application encountering an event. While non-stop debugging provides many benefits, non-stop debugging also presents many challenges.

SUMMARY OF THE INVENTION

Methods, apparatus, and products for impact indication of thread-specific events in a non-stop debugging environment are disclosed in this specification. The non-stop debugging environment includes a debugger configured to debug a debuggee. The debuggee is a multi-threaded debuggee that includes a number of threads of execution. In the non-stop debugging environment encountering an event by one of the threads stops execution of only the one thread without concurrently stopping execution of other threads. Also in the non-stop debugging environment, impact indication of thread-specific events in accordance with embodiments of the present invention includes tracking, by the debugger, activity associated with a thread-specific event and displaying, by the debugger in a graphical user interface (GUI), an indication of thread-specific event impact in dependence upon the tracked activity.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
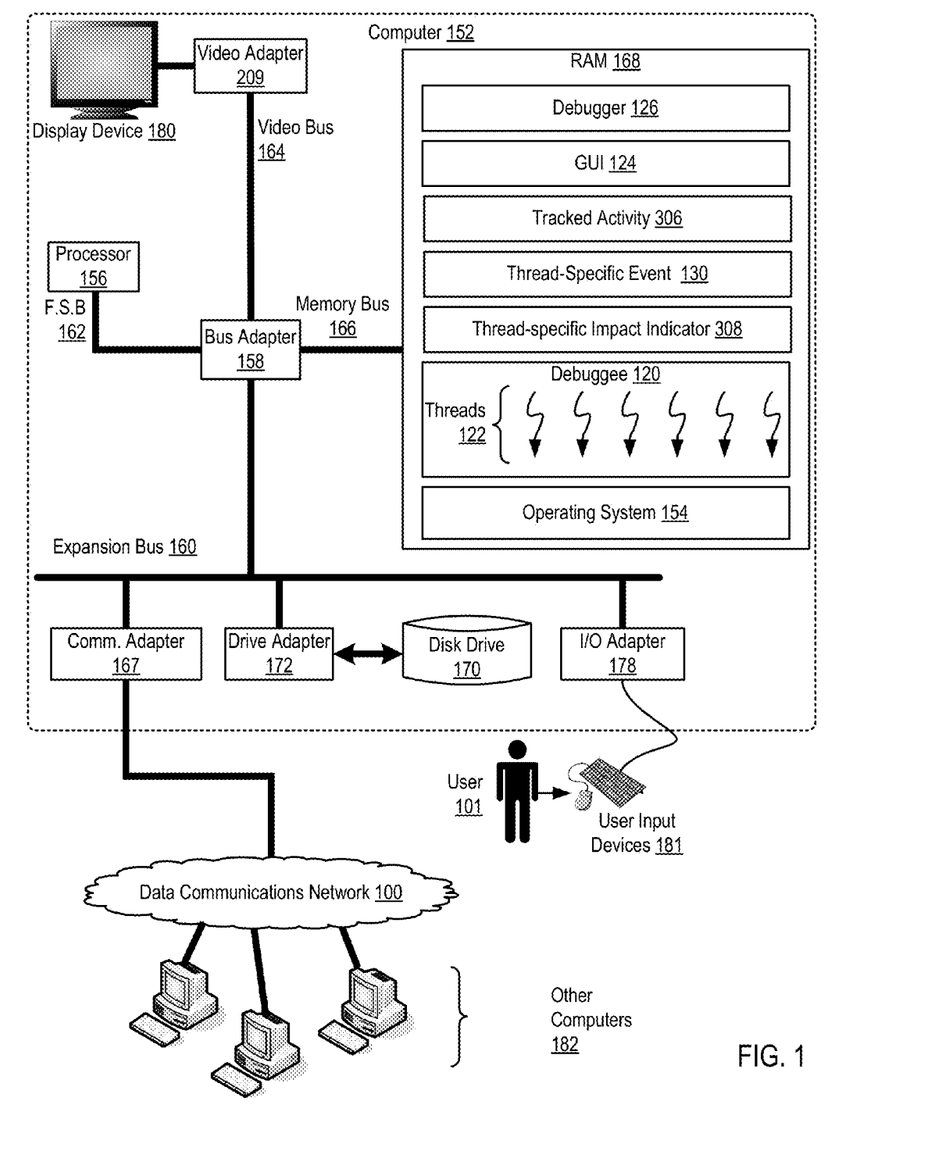
FIG. 1 sets forth a block diagram of a system for impact indication of thread-specific events in a non-stop debugging environment according to embodiments of the present invention.

Exemplary methods, apparatus, and products for impact indication of thread-specific events in a non-stop debugging environment in accordance with the present invention are described with reference to the accompanying drawings, beginning with FIG. 1. FIG. 1 sets forth a block diagram of a system for impact indication of thread-specific events in a non-stop debugging environment according to embodiments of the present invention. The system of FIG. 1 includes automated computing machinery comprising an exemplary computer (152) useful for impact indication of thread-specific events in a non-stop debugging environment according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) are a debugger (126) and a debuggee (120). A debugger (126) is an application that controls operation of another application—the debuggee (120)—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables.

In the example system of FIG. 1, the debugger (126) presents a graphical user interface (124) as a front-end of the debugger (126). Front-ends are extensions to debugger engines that provide Integrated Development Environment ('IDE') integration, program animation, and visualization features, rather than console-based command line interfaces. The 'front-end' directly faces a client—or user—in contrast to the debugger (126) in the example of FIG. 1, which interfaces indirectly with the clients through the GUI (124).

In the example system of FIG. 1, the debuggee (120) is a software application that executes as a process containing a number of threads (122) of execution. A 'thread' of execution as the term is used here refers to the smallest unit of processing that can be scheduled by an operating system. A thread generally results from a fork of a computer program into two or more concurrently running threads. The implementation of threads and processes differs from one operating system to another, but in most cases, a thread is contained inside a process. Multiple threads can exist within the same process and share resources such as memory, while different processes do not share these resources. In particular, the threads of a process share the process's computer program instructions and its context—the values that the process's variables reference at any given moment.

The system of FIG. 1 includes a non-stop debugging environment that includes the debugger (126) and the debuggee (120). The debugger supports non-stop debugging by insuring that when one thread of a multi-threaded debuggee encounters an event, execution of only that one of threads stops, without concurrently stopping execution of other threads. Consider, for example, a multi-threaded debuggee that includes three threads. In a non-stop debug environment, when one of the threads encounters an event, execution of that thread is stopped, but execution of the remaining two threads continues unabated. Either of the other two threads may then separately encounter an event, stopping execution of that thread, but no other thread. By contrast, a traditional all-stop debugging environment insures that all threads are stopped concurrently with any one thread encountering an event. Continuing with the above example of a triple threaded debuggee, when any one of the three threads encounters an event in a traditional all-stop debug environment, all three threads halt execution.

An event is a predefined occurrence during execution of a debuggee. Examples of events which may be encountered during execution of the debuggee include breakpoints, watchpoints, catchpoints, and the like. A breakpoint is a specification of a source code location at which a debuggee will pause or stop execution. A watchpoint is a breakpoint configured to pause or stop execution of the debuggee when a value of a particular expression changes. A catchpoint is another type of breakpoint configured to pause or stop execution of the debuggee when a specified event occurs such as the throwing of an exception or a load of a library, and so on.

In addition to supporting non-stop debugging, the debugger (126) in the example of FIG. 1 is also configured for impact indication of thread-specific events in the non-stop debugging environment in accordance with embodiments of the present invention. A thread-specific event is an event associated with a particular thread and the debugger automatically, without user interaction, resumes execution of any other thread that encounters the event. That is, other threads—threads not associated with a thread-specific event—may encounter the event an momentarily stop executing, but the debugger immediately (or nearly so) resumes the execution of those threads. Although the time between a thread's encounter with a thread-specific event and the debugger resuming execution of the thread may be very small, the performance of that thread and the debuggee application as a whole is impacted to some degree. If, for example, many threads not associated with a thread-specific event, encounter the event many times, the impact of stopping and resuming execution of these threads on the performance of the debuggee application may be noticeable by, if not intrusive to, a user of the debuggee application. To that end, the system of Figure may be configured to indicate impact of thread-specific events in accordance with embodiments of the present invention by tracking, by the debugger (126), activity (306) associated with a thread-specific event (130) and displaying, by the debugger in the GUI (124), an indication (308) of thread-specific event impact in dependence upon the tracked activity (306).

Activity associated with a thread-specific event is any measurable activity caused by the existence of the thread-specific event which may impact operational performance of the debuggee. Examples of such activity associated with a thread-specific event include a number of encounters of the event by any thread, a number of encounters of the event by threads not associated with the event, a number of encounters of the event over a predefined period of time, an average amount of time to restart execution of threads after encountering the event and so on as will occur to readers of skill in the art. By providing an indication of the impact of a thread-specific event, a user of the debugger will be informed of the impact on performance of the debuggee by the event and may determine whether to disable the thread-specific event.

Also stored in RAM (168) is an operating system (154). Operating systems useful in computers that carry out impact indication of thread-specific events in a non-stop debugging environment according to embodiments of the present invention include UNIX™ Linux™ Microsoft XP™ AIX™ IBM's i™, and others as will occur to those of skill in the art. The operating system (154), debugger (126), debuggee (126), and GUI (124) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that operate for impact indication of thread-specific events in a non-stop debugging environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user (101) input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for impact indication of thread-specific events in a non-stop debugging environment according to embodiments of the present invention include modems for wired dial-up communications, Ethernet (IEEE 802.3) adapters for wired data communications network communications, and 802.11 adapters for wireless data communications network communications.

The arrangement of computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
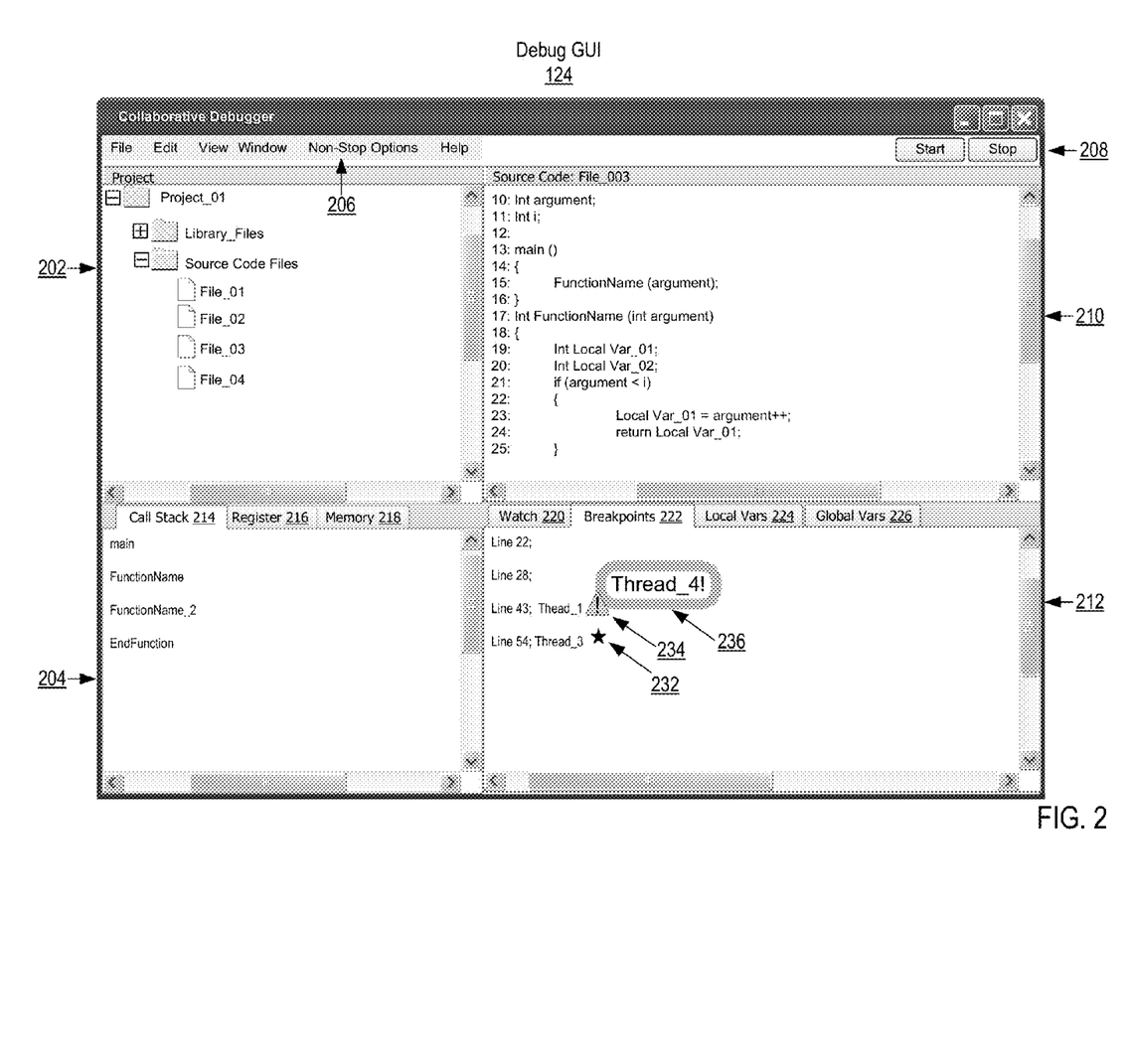
FIG. 2 sets forth an example non-stop debugging GUI presented to a user in accordance with embodiments of the present invention.

For further explanation, FIG. 2 sets forth an example non-stop debugging GUI (124) presented to a user in accordance with embodiments of the present invention. The example GUI (124) of FIG. 2 provides an interface for a user to control operation of a debugger that supports non-stop debugging. The debugger presenting the example GUI (124) of FIG. 2 is configured to debug a multi-threaded debuggee. That is, the debugger presenting the example GUI (124) of FIG. 2 and the multi-threaded debuggee form a non-stop debugging environment.

The example GUI (124) of FIG. 2 includes a menu bar (208) that, in turn, includes a number of separate menus: a File menu, an Edit menu, a View menu, a Non-Stop Options menu, and a Help menu. The Non-Stop Options menu (206), when selected, may provide a user with various menu items that support non-stop debugging.

The example GUI (124) of FIG. 2 also includes several independent portions—called panes (as in 'window panes') for clarity of explanation—a project pane (202), a source code pane (210), and two separate data panes (204, 212). Project pane (202) presents the files and resources available in a particular software development project. Source code pane (210) presents the source code of the multi-threaded debuggee. The data panes (204, 212) present various data useful in debugging the source code. In the example of FIG. 2, data pane (204) includes four tabs, each of which presents different data: a call stack tab (214), a register tab (214), and a memory tab (218). Data pane (212) includes four tabs: a watch list tab (220), a breakpoints (222) tab, a local variable tab (224), and a global variable tab (226).

The GUI (124) of FIG. 2 may support impact indication of thread-specific events in a non-stop debugging environment in accordance with embodiments of the present invention. The debugger presenting the example GUI (124) of FIG. 2 may track activity associated with a thread-specific event and displaying, by the debugger in the GUI (124), an indication (232, 234, and 236) of thread-specific event impact in dependence upon the tracked activity. The warning symbol (234), star (232) and thread identifier (236) in the example of FIG. 2, represent various types of indicators which may be displayed by the debugger in the GUI (124) in dependence upon tracked activity associated with a thread-specific event, such as the breakpoints at line 43, and line 54. The warning symbol indicator (234) may indicate that a number of encounters of the event at line 43 during a predefined period of time exceeds a predetermined threshold. The thread identifier (236), 'Thread 4,' may indicate that a thread not associated with the thread-specific event (Thread 4) has encountered the breakpoint at line 43 greater than a predetermined number of times, a predetermined threshold. The star indicator (232) may be displayed as a range-specific indication of a number of encounters of the breakpoint at line 54. That is, in some embodiments, the debugger presenting the GUI (124) of FIG. 2 may track the number of encounters of a thread-specific event by threads not associated with the event and identify a range of tracked number of encounters and displayed a range-specific indicator. Consider, for example, that the debugger is configured to display a green indicator for encounter less than 100, a yellow indicator for encounters less than between 101 and 200, and a red indicator for greater than 200 encounters. Alternatively, different types of indicators, including audible indications may be displayed for the user for each different range. In this way, a user may be notified of the impact of the thread specific event in real-time.

The GUI items, menus, window panes, tabs, and so on depicted in the example GUI (124) of FIG. 2, are for explanation, not for limitation. Other GUI items, menu bar menus, drop-down menus, list-boxes, window panes, tabs, and so on as will occur to readers of skill in the art may be included in GUIs presented by a debugger in a system configured for non-stop debugging in accordance with embodiments of the present invention.

Figure 3:
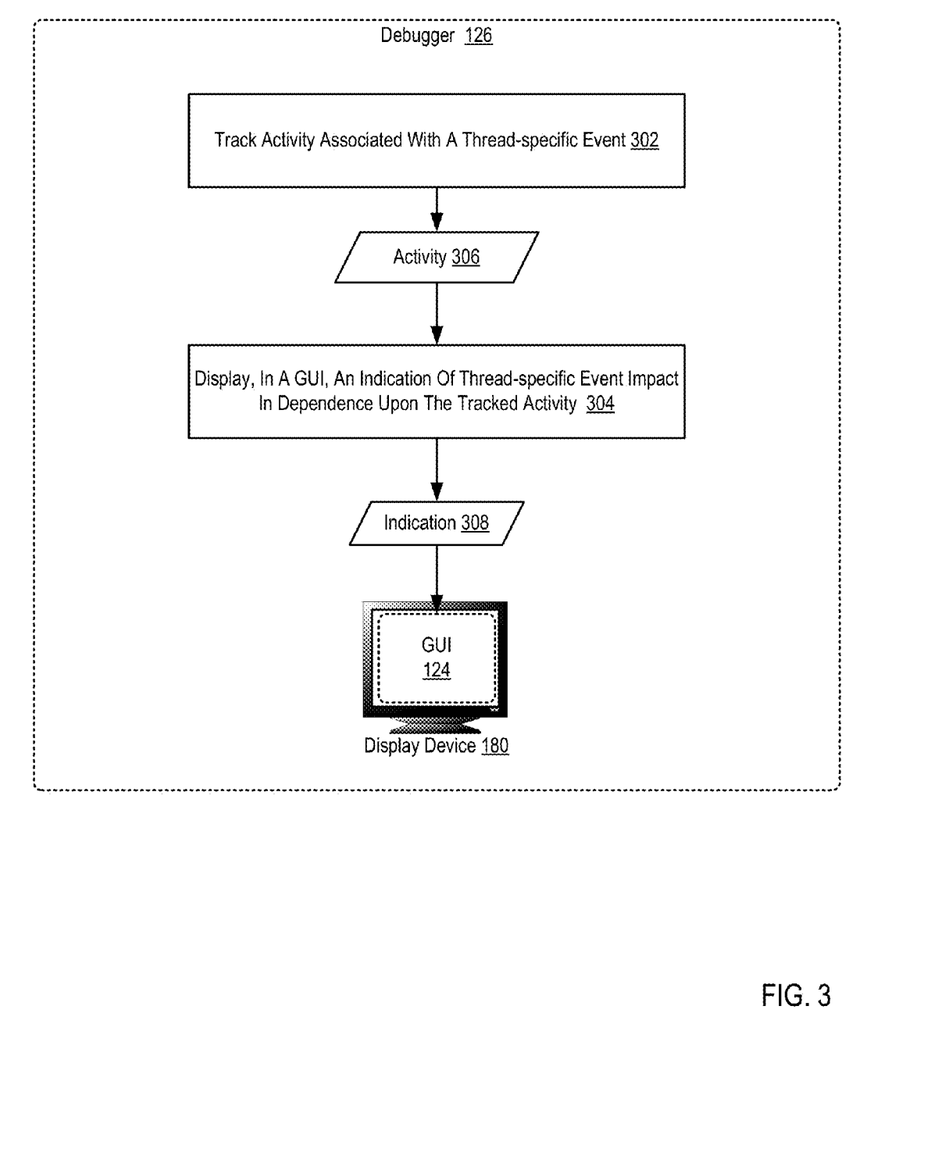
FIG. 3 sets forth a flow chart illustrating an exemplary method for impact indication of thread-specific events in a non-stop debugging environment, according to embodiments of the present invention.

For further explanation, FIG. 3 sets forth a flow chart illustrating an exemplary method for impact indication of thread-specific events in a non-stop debugging environment, according to embodiments of the present invention. In the method of FIG. 3, the non-stop debugging environment includes a debugger (126) configured to debug a debuggee that includes a plurality of threads of execution. In the debug environment of FIG. 3, encountering an event by one of the threads stops execution of only the one thread without concurrently stopping execution of other threads.

The method of FIG. 3 includes tracking (302), by the debugger, activity associated with a thread-specific event. Tracking (302) activity (305) associated with a thread-specific event is described below in detail with regard to FIGS. 4-8 but may be carried out generally by tracking encounters of the event or average time between an event encounter and resuming execution of a thread not associated with the event.

The method of FIG. 3 also includes displaying (304), by the debugger (126) in a GUI (124), an indication (308) of thread-specific event impact in dependence upon the tracked activity (306). Displaying (304) an indication (308) of thread-specific event impact in dependence upon the tracked activity (306) may be carried out by in various ways including, for example, by displaying one or more GUI objects representing an amount of impact or some impact greater than a predefined threshold.

Figure 4:
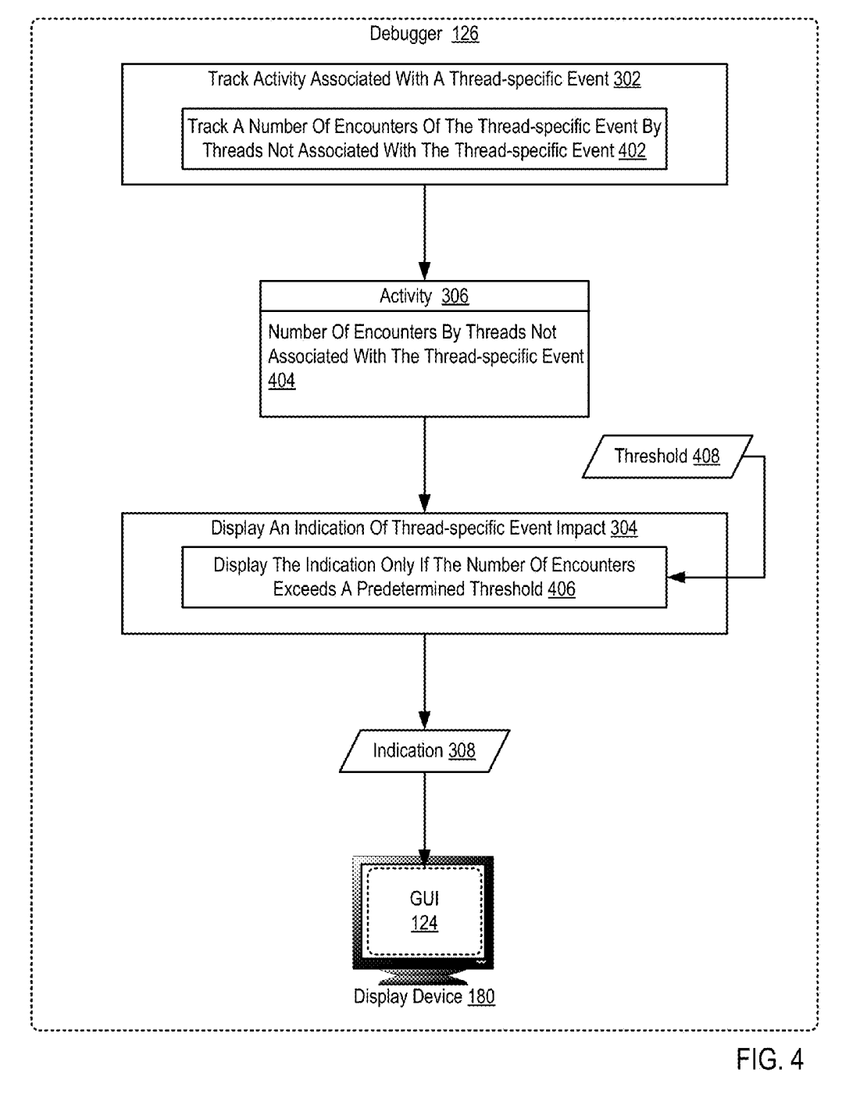
FIG. 4 sets forth a flow chart illustrating a further exemplary method for impact indication of thread-specific events in a non-stop debugging environment according to embodiments of the present invention.

For further explanation, FIG. 4 sets forth a flow chart illustrating a further exemplary method for impact indication of thread-specific events in a non-stop debugging environment according to embodiments of the present invention. The method of FIG. 4 is similar to the method of FIG. 3 in that the non-stop debugging environment of the method of FIG. 4 also includes a debugger (126) configured to debug a multi-threaded debuggee, where encountering an event by one of the threads stops execution of only the one thread without concurrently stopping execution of other threads. The method of FIG. 4 is also similar to the method of FIG. 3 in that the method of FIG. 4 includes tracking (302) activity (306) associated with a thread-specific event and displaying (304) an indication (308) of thread-specific event impact in dependence upon the tracked activity.

The method of FIG. 4 differs from the method of FIG. 3, however, in that in the method of FIG. 4 tracking (302) activity (306) associated with a thread-specific event is carried out by tracking (402) a number (404) of encounters of the thread-specific event by threads not associated with the thread-specific event and displaying (304) an indication (308) of thread-specific event impact is carried out by displaying (406) the indication (406) only if the number of encounters exceeds a predetermined threshold. In the method of FIG. 4, the debugger is configured to display an indication of impact only if the number of encounters of the thread-specific event is greater than a predefined threshold. In this way, the debugger may be configured to ignore a first set of encounters—representing little to no impact—and display an indication only upon an appreciable amount of impact by a thread-specific event. The predefined threshold (408) may be user-configurable. That is, the user may set number of encounters that cause an indication to be displayed.

Figure 5:
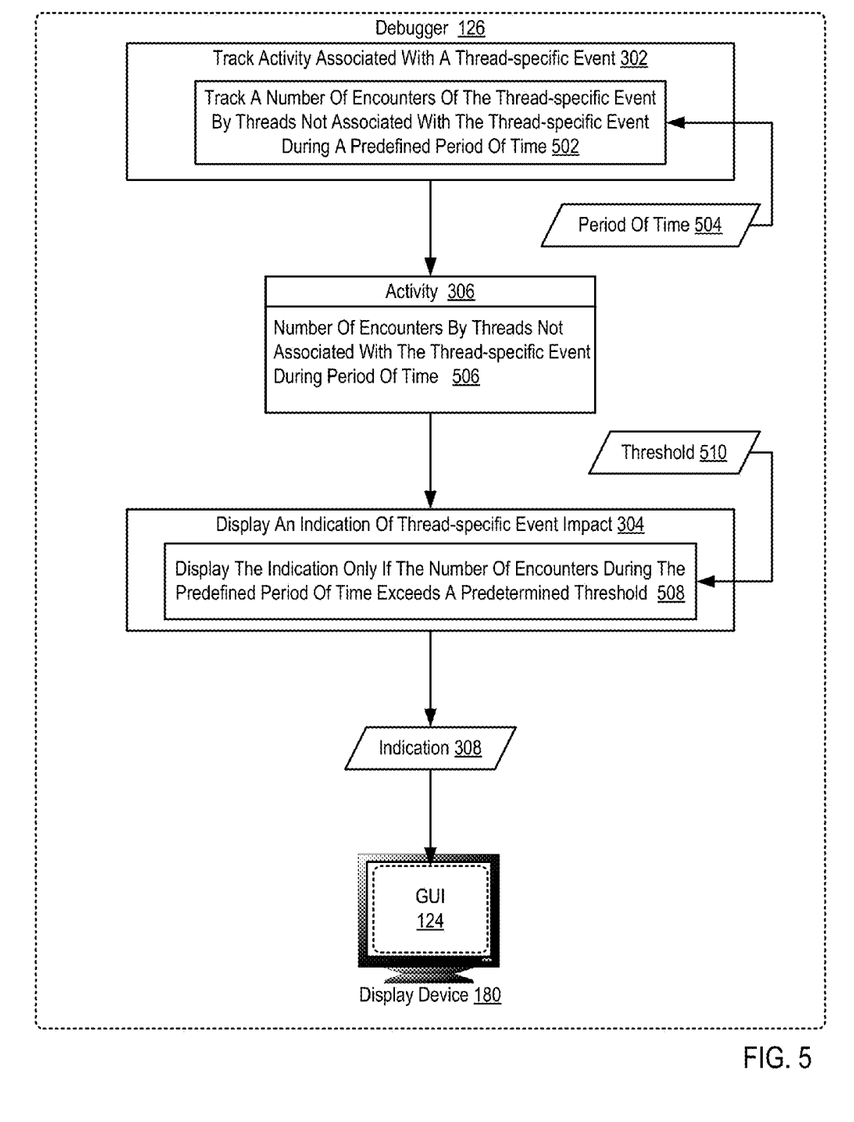
FIG. 5 sets forth a flow chart illustrating a further exemplary method for impact indication of thread-specific events in a non-stop debugging environment according to embodiments of the present invention.

For further explanation, FIG. 5 sets forth a flow chart illustrating a further exemplary method for impact indication of thread-specific events in a non-stop debugging environment according to embodiments of the present invention. The method of FIG. 5 is similar to the method of FIG. 3 in that the non-stop debugging environment of the method of FIG. 5 also includes a debugger (126) configured to debug a multi-threaded debuggee, where encountering an event by one of the threads stops execution of only the one thread without concurrently stopping execution of other threads. The method of FIG. 5 is also similar to the method of FIG. 3 in that the method of FIG. 5 includes tracking (302) activity (306) associated with a thread-specific event and displaying (304) an indication (308) of thread-specific event impact in dependence upon the tracked activity.

The method of FIG. 5 differs from the method of FIG. 3 in that in the method of FIG. 5, tracking (302) activity (306) associated with a thread-specific event includes tracking (502) a number (506) of encounters of the thread-specific event by threads not associated with the thread-specific event during a predefined period of time and displaying (304) an indication of thread-specific event impact includes displaying (508) the indication only if the number (508) of encounters during the predefined period of time (504) exceeds a predetermined threshold (510). Tracking (502) a number (506) of encounters of the thread-specific event by threads not associated with the thread-specific event during a predefined period of time (504) may be carried out in various way including, for example, incrementing a counter upon each encounter until either the counter exceeds a predetermined threshold (upon which the indication (308) is displayed) or the predefined period of time (504) ends. After a predefined period of time, the counter may be initialized and counting may be resumed in the same manner. In this way, the debugger (126) is configured to display indications of impact based upon a real-time running average of encounters. In some embodiments the threshold (510) as well as the period of time (504) may be user-configurable.

Figure 6:
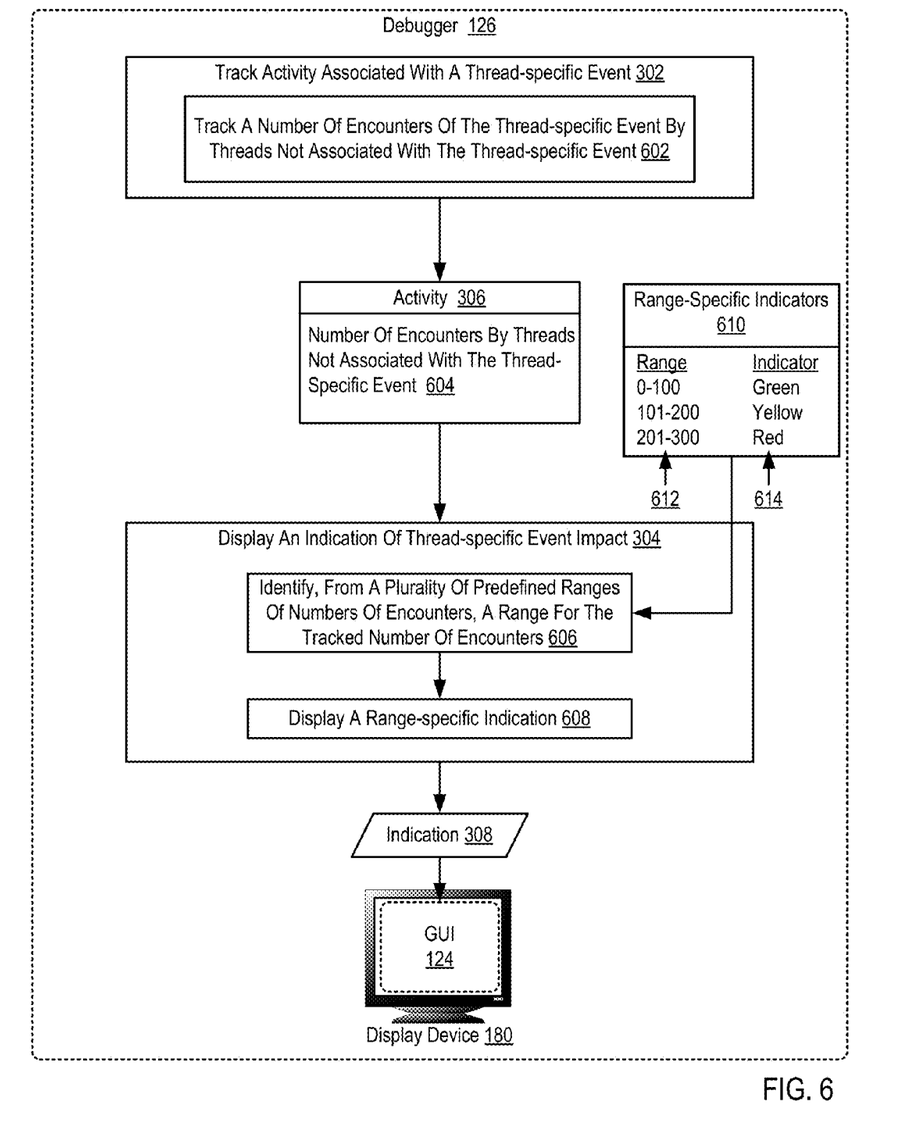
FIG. 6 sets forth a flow chart illustrating a further exemplary method for impact indication of thread-specific events in a non-stop debugging environment according to embodiments of the present invention.

For further explanation, FIG. 6 sets forth a flow chart illustrating a further exemplary method for impact indication of thread-specific events in a non-stop debugging environment according to embodiments of the present invention. The method of FIG. 6 is similar to the method of FIG. 3 in that the non-stop debugging environment of the method of FIG. 6 also includes a debugger (126) configured to debug a multi-threaded debuggee, where encountering an event by one of the threads stops execution of only the one thread without concurrently stopping execution of other threads. The method of FIG. 6 is also similar to the method of FIG. 3 in that the method of FIG. 6 includes tracking (302) activity (306) associated with a thread-specific event and displaying (304) an indication (308) of thread-specific event impact in dependence upon the tracked activity.

The method of FIG. 6 differs from the method of FIG. 3, however, in that in the method of FIG. 6, tracking (302) activity (306) associated with a thread-specific event includes tracking (602) a number (604) of encounters of the thread-specific event by threads not associated with the thread-specific event and displaying (304) an indication (308) of thread-specific event impact includes identifying (606), from a plurality of predefined ranges (612) of numbers of encounters, a range for the tracked number (604) of encounters and displaying (608) a range-specific indication (614). A range-specific indication may be configured to represent severity of impact. For example, a red warning symbol may be associated with a range of 201-300 encounters of the event, while a green symbol may be associated with a range of 0-110 encounters. In the example of FIG. 6, a table (610) of range-specific indicators includes two columns: a column (612) of ranges and a column (614) of range specific indicators. Readers of skill in the art will recognize that many different types of a range-specific indicators may be employed by debuggers configured for impact indication in accordance with embodiments of the present invention. Range-specific indicators may be icons, images, visual, audible, various colors, fonts, and so on.

Figure 7:
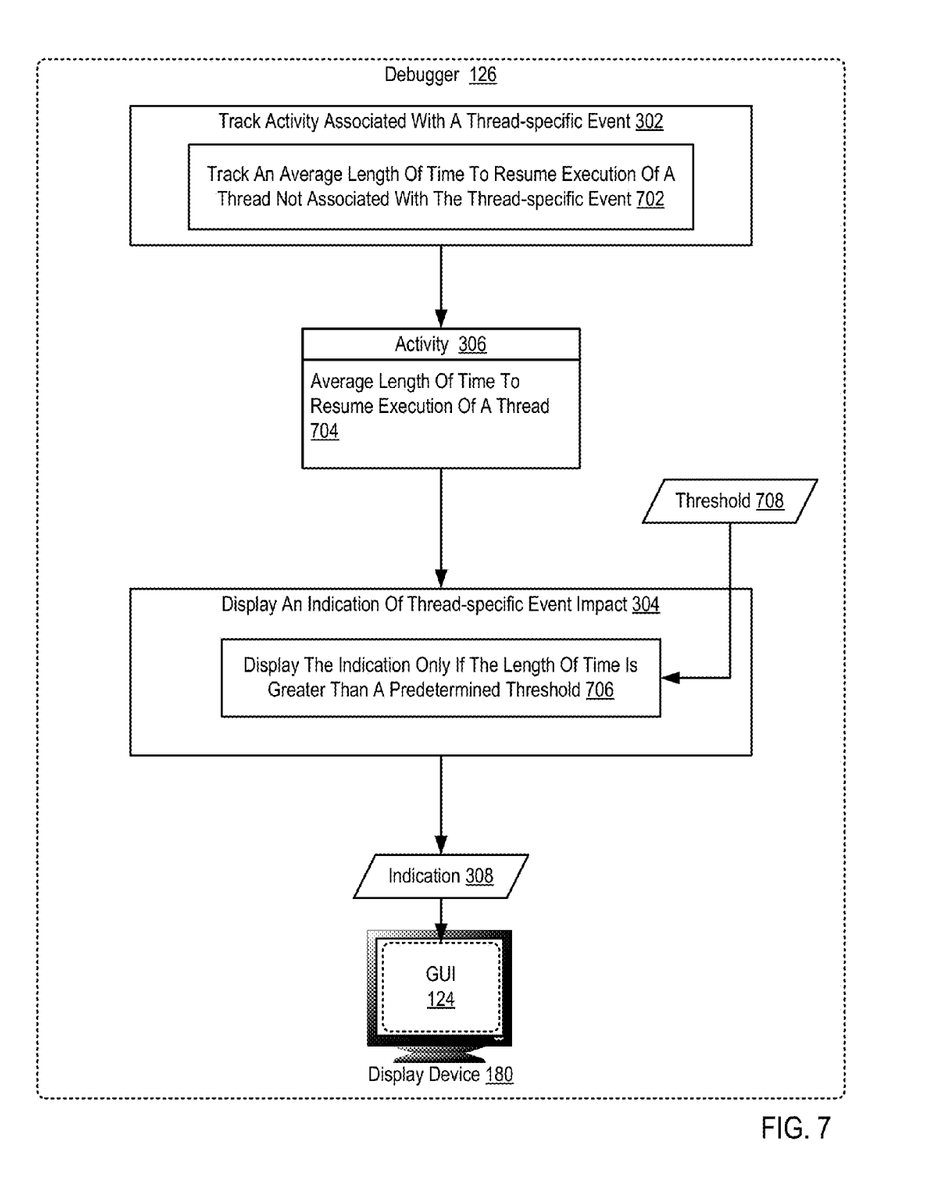
FIG. 7 sets forth a flow chart illustrating a further exemplary method for impact indication of thread-specific events in a non-stop debugging environment according to embodiments of the present invention.

For further explanation, FIG. 7 sets forth a flow chart illustrating a further exemplary method for impact indication of thread-specific events in a non-stop debugging environment according to embodiments of the present invention. The method of FIG. 7 is similar to the method of FIG. 3 in that the non-stop debugging environment of the method of FIG. 7 also includes a debugger (126) configured to debug a multi-threaded debuggee, where encountering an event by one of the threads stops execution of only the one thread without concurrently stopping execution of other threads. The method of FIG. 7 is also similar to the method of FIG. 3 in that the method of FIG. 7 includes tracking (302) activity (306) associated with a thread-specific event and displaying (304) an indication (308) of thread-specific event impact in dependence upon the tracked activity.

The method of FIG. 7 differs from the method of FIG. 3, however, in that in the method of FIG. 7, tracking (702) activity associated with a thread-specific event includes tracking (702) an average length of time (704) to resume execution of a thread not associated with the thread-specific event after encountering the thread-specific event and displaying (706) an indication (308) of thread-specific event impact includes displaying (706) the indication only if the length of time (704) is greater than a predetermined threshold (708).

As mentioned above, the debugger (126) is configured to resume execution of a thread encountering the thread-specific event, if that thread is not associated with the event. Also, such resumption of execution is carried out generally automatically, without any interaction by a user. That is, a user need not instruct a debugger to stop such a thread. During periods of time in which debugger activity is high, the time to resume a thread after the thread encounters a thread-specific event and stops may be high. An average amount of time to restart such threads may be an indication of the impact that encounters with the thread-specific event are having on the execution of the debuggee. The greater the length of time to restart, the greater the impact on the performance of the debuggee.

Figure 8:
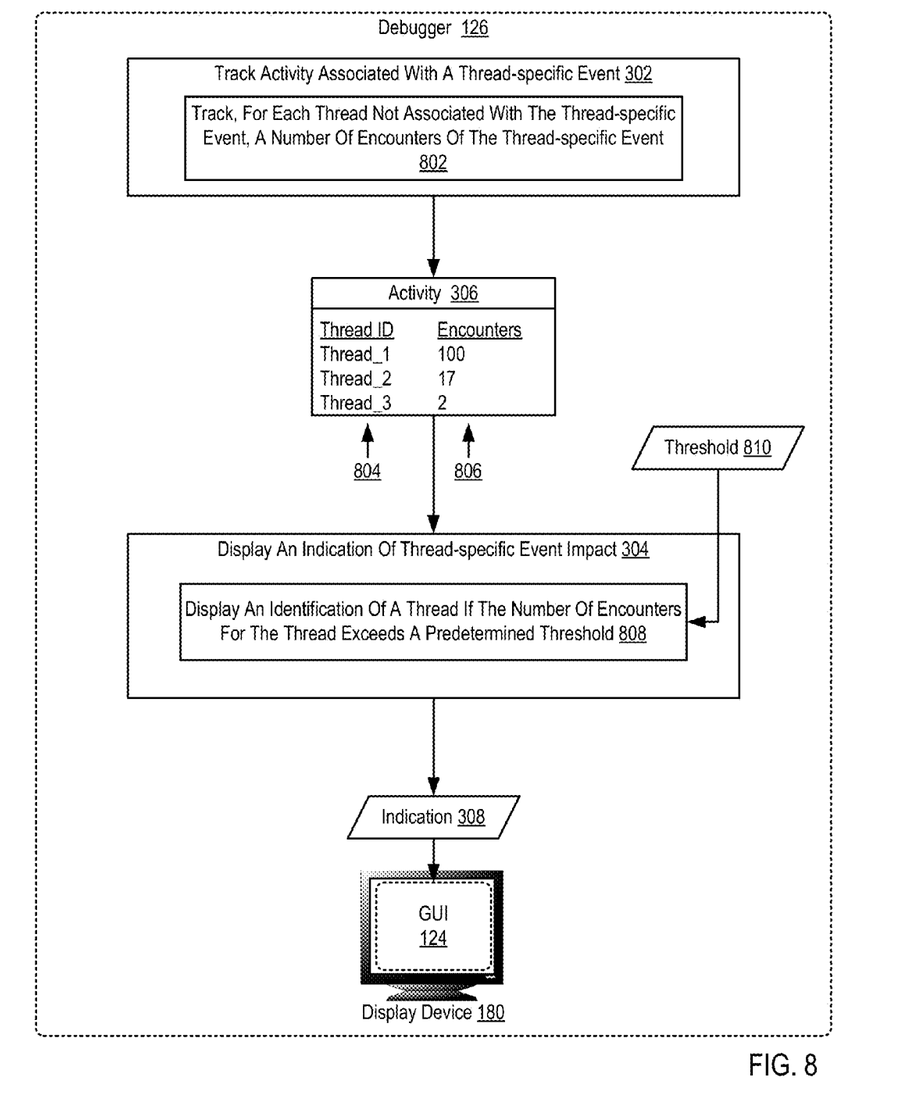
FIG. 8 sets forth a flow chart illustrating a further exemplary method for impact indication of thread-specific events in a non-stop debugging environment according to embodiments of the present invention.

For further explanation, FIG. 8 sets forth a flow chart illustrating a further exemplary method for impact indication of thread-specific events in a non-stop debugging environment according to embodiments of the present invention. The method of FIG. 8 is similar to the method of FIG. 3 in that the non-stop debugging environment of the method of FIG. 8 also includes a debugger (126) configured to debug a multi-threaded debuggee, where encountering an event by one of the threads stops execution of only the one thread without concurrently stopping execution of other threads. The method of FIG. 8 is also similar to the method of FIG. 3 in that the method of FIG. 8 includes tracking (302) activity (306) associated with a thread-specific event and displaying (304) an indication (308) of thread-specific event impact in dependence upon the tracked activity.

FIG. 8 differs from the method of FIG. 3, however, in that in the method of FIG. 8 tracking (302) activity (306) associated with a thread-specific event includes tracking (802), for each thread not associated with the thread-specific event, a number (806) of encounters of the thread-specific event and displaying (304) an indication (308) of thread-specific event impact includes displaying (802) an identification (804) of a thread not associated with the thread-specific event if the number of encounters for the thread exceeds a predetermined threshold (810).

Rather than generally tracking encounters for all threads not associated with the thread specific, the method of FIG. 8 is thread-specific. That is, the method of FIG. 8 includes tracking (802) a number (806) of encounters of the thread-specific event for each thread not associated with the thread-specific event. Such tracking (802) may include maintaining a table of activity (306) as in FIG. 8 in which, for each encounter of the thread-specific event by a thread not associated with the event, a thread identifier is added to the table (if not previously added) and a count is incremented.

Displaying (802) an identification (804) of a thread not associated with the thread-specific event if the number of encounters for the thread exceeds a predetermined threshold (810) may be beneficial in some circumstances. Consider, for example, a thread in a loop that repeatedly encounters the same thread-specific event. The event in such a scenario provides some impact at least to the performance of the looping thread—on each loop the thread is stopped and must be resumed. A user, therefore, upon an indication of impact and an identifier of a thread encountering the event greater than a predetermined threshold, may remove the event to limit the impact.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of impact indication of thread-specific events in a non-stop debugging environment, the non-stop debugging environment comprising a debugger configured to debug a debuggee comprising a plurality of threads of execution, wherein encountering an event by one of the threads stops execution of only the one thread without concurrently stopping execution of other threads, the method comprising:
   tracking, by the debugger, activity associated with a thread-specific event, wherein only one thread of the plurality of threads is associated with the thread-specific event; wherein tracking activity associated with a thread-specific event further comprises tracking a number of encounters of the thread-specific event by threads not associated with the thread-specific event; and
   displaying, by the debugger in a graphical user interface (GUI), an indication of thread-specific event impact in dependence upon the tracked activity.

2. The method of claim 1 wherein:
   displaying an indication of thread-specific event impact further comprises displaying the indication only if the number of encounters exceeds a predetermined threshold.

3. The method of claim 1 wherein:
   displaying an indication of thread-specific event impact further comprises displaying the indication only if the number of encounters during a predefined period of time exceeds a predetermined threshold.

4. The method of claim 1 wherein:
   displaying an indication of thread-specific event impact further comprises:
   identifying, from a plurality of predefined ranges of numbers of encounters, a range for the tracked number of encounters; and
   displaying a range-specific indication.

5. The method of claim 1 wherein:
   tracking activity associated with a thread-specific event further comprises tracking an average length of time to resume execution of a particular thread not associated with the thread-specific event after encountering the thread-specific event; and
   displaying an indication of thread-specific event impact further comprises displaying the indication only if the length of time is greater than a predetermined threshold.

6. The method of claim 1 wherein:
   tracking activity associated with a thread-specific event further comprises tracking, for each thread not associated with the thread-specific event, a number of encounters of the thread-specific event; and
   displaying an indication of thread-specific event impact further comprises displaying an identification of a thread not associated with the thread-specific event if the number of encounters for the thread exceeds a predetermined threshold.

* * * * *